United States Patent [19]

Smith

[11] 4,397,152
[45] Aug. 9, 1983

[54] SOLAR FURNACE
[76] Inventor: Derrick A. Smith, P.O. Box 1974, Hollywood, Fla. 33020
[21] Appl. No.: 191,123
[22] Filed: Sep. 26, 1980
[51] Int. Cl.³ .............................. F03G 7/02; F24J 3/02
[52] U.S. Cl. ................................. 60/641.15; 126/430; 126/433; 126/436; 126/438
[58] Field of Search ............... 126/433, 438, 436, 400, 126/430; 60/641.15

[56] References Cited

U.S. PATENT DOCUMENTS

| | | | |
|---|---|---|---|
| 2,428,876 | 10/1947 | Hawkins | 126/428 X |
| 3,901,036 | 8/1975 | Martin | 126/442 X |
| 3,915,147 | 10/1975 | Rineer | 126/433 |
| 3,915,148 | 10/1975 | Fletcher et al. | 126/422 |
| 4,068,474 | 1/1978 | Dimitroff | 60/641.15 |
| 4,091,622 | 5/1978 | Marchesi | 60/641.5 |
| 4,131,158 | 12/1978 | Abbot et al. | 126/435 X |
| 4,280,482 | 7/1981 | Nilsson, Sr. | 126/430 |

FOREIGN PATENT DOCUMENTS

| | | | |
|---|---|---|---|
| 862843 | 3/1941 | France | 60/641.15 |
| 413229 | 7/1934 | United Kingdom | 60/641.15 |

Primary Examiner—Larry Jones
Attorney, Agent, or Firm—Martin J. Marcus

[57] ABSTRACT

A solar furnace electricity generating system is provided herein. It includes a concentrator and accumulator for the sun's rays to generate a concentrated high temperature solar beam. A heat hearth is disposed, e.g., in the ground, to absorb the concentrated high temperature solar beam. A plurality of concentric alternating heat-transfer-medium-containing chambers and heat absorption zones are provided around the heat hearth. These zones are the following: a primary chamber containing a first heat-transfer-medium in heat-transfer contact with the heat hearth; a primary heat-absorption zone containing a primary heat-absorbing material in heat-transfer contact with the primary chamber; a secondary chamber containing the same heat-transfer-medium in heat-transfer contact with the primary zone; a secondary heat-absorption zone containing a second and different heat-absorbing material in heat-transfer contact with the secondary chamber; and a tertiary chamber containing the same heat-transfer medium in heat-transfer contact with the secondary zone. Valved outlet lines are provided from each heat-transfer-medium-containing chamber to conduct such heat-transfer media to a common vapor outlet line leading to a vapor-powered electricity-generating turbine. An outlet line is provided from the liquid reservoir to a plurality of valved inlet lines, each leading to an associated heat-transfer-medium-containing chamber. Control means are provided to actuate selected vaporization/condensation cycles from selected heat-transfer-medium-containing chambers, generally from the outer zones first and then from the inner core zones, to the exclusion of similar vaporization/condensation cycles from other heat-transfer-medium-containing chambers. In this way, substantially continuous generation of electricity during periods of daylight and nighttime is provided.

25 Claims, 2 Drawing Figures

SOLAR FURNACE

BACKGROUND OF THE INVENTION (i) Field of the Invention

This invention relates to a solar furnace and means associated therewith for generating electric power from the energy of the sun.

(ii) Description of the Prior Art

Electricity is one of the most widely used forms of energy. It is known that electricity may be produced by hydroelectric generators, combustion engines powered by expensive fuels, e.g., oil or natural gas, by electromotive steam engines powered by coal, or oil, or by the use of natural energy. These procedures suffer the deficiency that they may use diminishing non-renewable resources, and of pollution of the atmosphere. Moreover, in many parts of the world, there is no access to facilities for generating electricity by hydro generators.

SUMMARY OF THE INVENTION (i) Aims of the Invention

It would therefore be advantageous to be able to produce electricity through the use of a readily available renewable energy source. It should also be applicable wherever sunlight is available and where a finite supply of a heat-transfer fluid is available.

(ii) Statement of the Invention

By this invention, a solar furnace electricity generating system is provided comprising: (a) a concentrator and accumulator for the sun's rays to generate a concentrated high temperature solar beam; (b) a heat hearth disposed to absorb heat from the concentrated high temperature solar beam; (c) a plurality of concentric alternating heat-transfer-medium-containing chambers and heat absorption zones around the heat hearth, the plurality of zones comprising; (i) a primary chamber containing a first heat-transfer-medium in heat-transfer contact with the heat hearth; (ii) a primary heat-absorption zone containing a primary heat-absorbing material in heat-transfer contact with the primary chamber; (iii) a secondary chamber containing the same heat-transfer-medium in heat-transfer contact with the primary zone; (iv) a secondary heat-absorption zone containing a second and different heat-absorbing material in heat-transfer contact with the secondary chamber; and (v) a tertiary chamber containing the same heat-transfer-medium-containing chamber to conduct such heat-transfer media to a common vapour outlet line leading to a vapour-powered electricity-generating turbine; (e) valved outlet line from the turbine to a liquid reservoir; (f) valved outlet means from the liquid reservoir to a plurality of valved inlet lines, each leading to an associated heat-transfer-medium-containing chamber; and (g) control means to actuate selected vapourization/condensation cycles from selected heat-transfer-medium-containing chambers, to the exclusion of similar vapourization/condensation cycles from other heat-transfer-medium-containing chambers; thereby to result in substantially continuous generation of electricity during periods of daylight and nighttime.

(iii) Other Features of the Invention

By a feature thereof, the heat hearth is provided with a central heat shaft to absorb heat from the concentrated high temperature solar beam.

By another feature thereof, the heat shaft is pierced by a plurality of heat-absorbing metal rods.

By another feature thereof, each such heat-absorbing metal rod projects into the heat hearth and is provided with a plurality of heat-dissipating ribs.

By another feature, the heat hearth is packed with a heat-absorbing, heat-transfer material.

By another feature, the heat-absorbing, heat-transfer material is comminuted metal.

By other features thereof, the number of concentric heat-transfer zones and heat-absorption zones can be extended practically indefinitely to accommodate the heat storage capacity required.

By another feature thereof, each such primary, secondary and tertiary chamber comprises a double walled, hollow, rectangular parallelepiped chamber formed of a heat-conducting, structural material such as steel.

By another feature, the primary zone is packed with a heat-transfer medium such as sand, stone or clay.

By another feature, the seconeary zone is packed with a heat-transfer medium such as bricks.

By another feature, the system includes a first heat-insulating zone in heat-transfer contact with the tertiary chamber.

By another feature thereof, the first heat-insulating zone is packed with a heat-insulating material such as asbestos.

By another feature, the system is encased in a heat-insulating structural casing such as concrete.

By another feature of this invention, the concentrator (a) includes a semi-globular hollow one-way mirrored bulb terminating in a depending shaft for the passage of the collimated concentrated high temperature solar beam.

By another feature, the semi-globular bulb includes additional heat-reflecting internal mirrors to assist in collimating and concentrating the sun's rays.

By another feature, the system includes at least one connecting heat-conducting shaft to convey the solar beam to the heat shaft, assisted by 45° reflectors.

By other features thereof, the angle of the reflectors can be varied from 45° to facilitate the angle of the tubes which will be unique for each solar furnace of embodiments of this invention.

By another feature, the heat shaft includes a heat concentrating lens therein.

By another feature, the valves in the outlets from each heat-transfer-medium-containing chamber are one-way valves adapted to open automatically at a minimum pre-set vapour pressure.

By another feature of this invention, the valves in the outlets to each heat-transfer-medium-containing chamber are one-way valves adapted to open upon positive activation provided a minimum pre-set vapour pressure condition is satisfied.

By another feature, the valve on the outlet line from the turbine is a one-way valve adapted to be opened upon positive activation.

By another feature, the reservoir includes an upper primary reservoir and a lower liquid transfer reservoir.

By another feature thereof, the upper reservoir is provided with auxiliary heat exchanger to recover sensible heat from liquid in the upper reservoir.

By another feature, the primary reservoir is connected to the lower liquid transfer reservoir by means of a primary check-valved flow conduit, and by a secondary, ball valve controlled flow conduit, the ball valve being a caged valve which moves in a controlled fashion either to seal a main outlet from the lower liquid transfer reservoir, or to allow liquid to enter the lower liquid transfer reservoir from the primary reservoir.

By a further variant, the system includes a parallel auxiliary flow system operated by a positively powered pump.

By another feature of this invention, the heat-transfer medium is water.

BRIEF DESCRIPTION OF THE DRAWINGS

In the accompanying drawings.

DESCRIPTION OF PREFERRED EMBODIMENT

Figure 1:
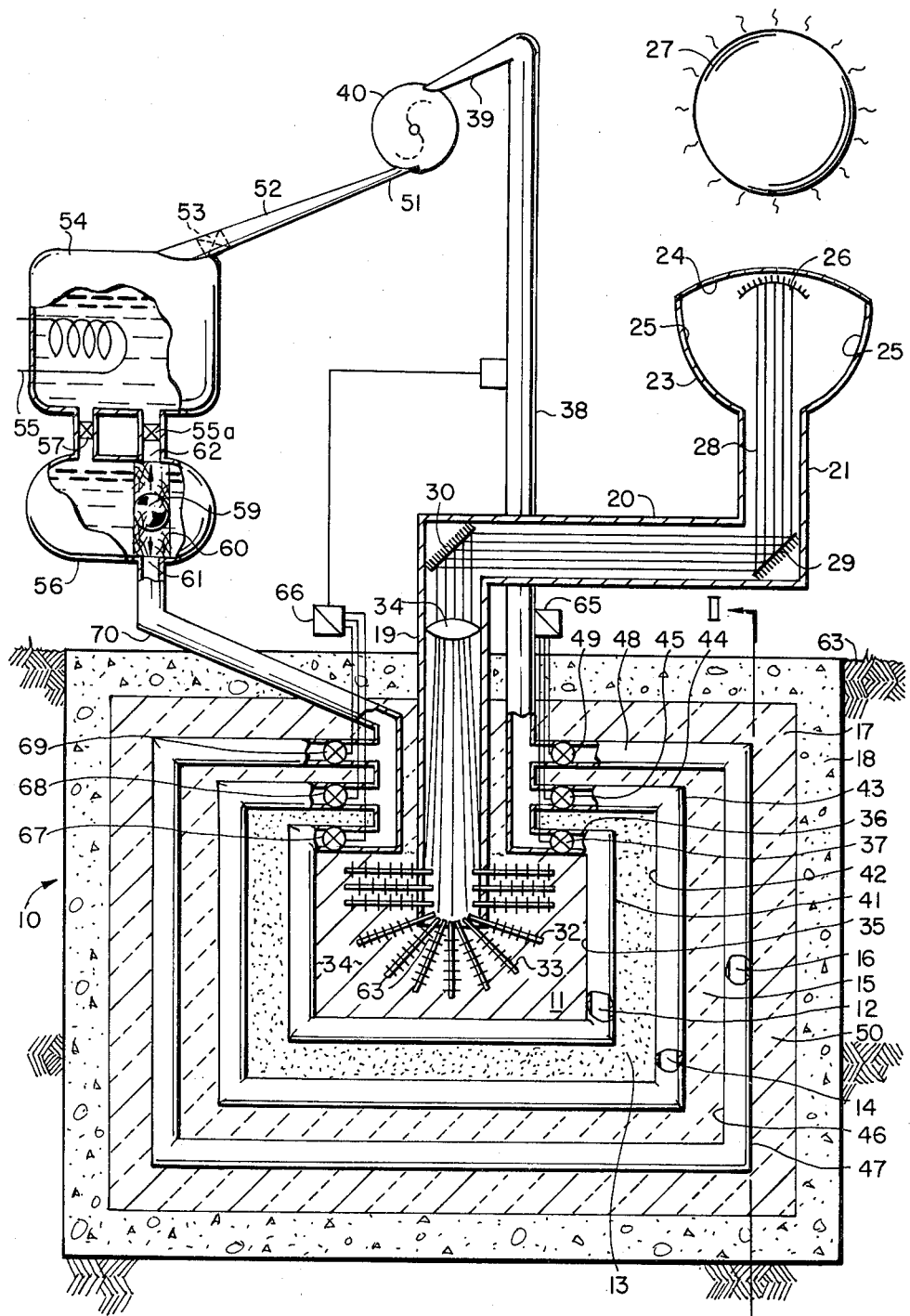
FIG. 1 is a schematic view of the solar furnace of an embodiment of the invention with means associated therewith for the generation of electricity.
Figure 2:
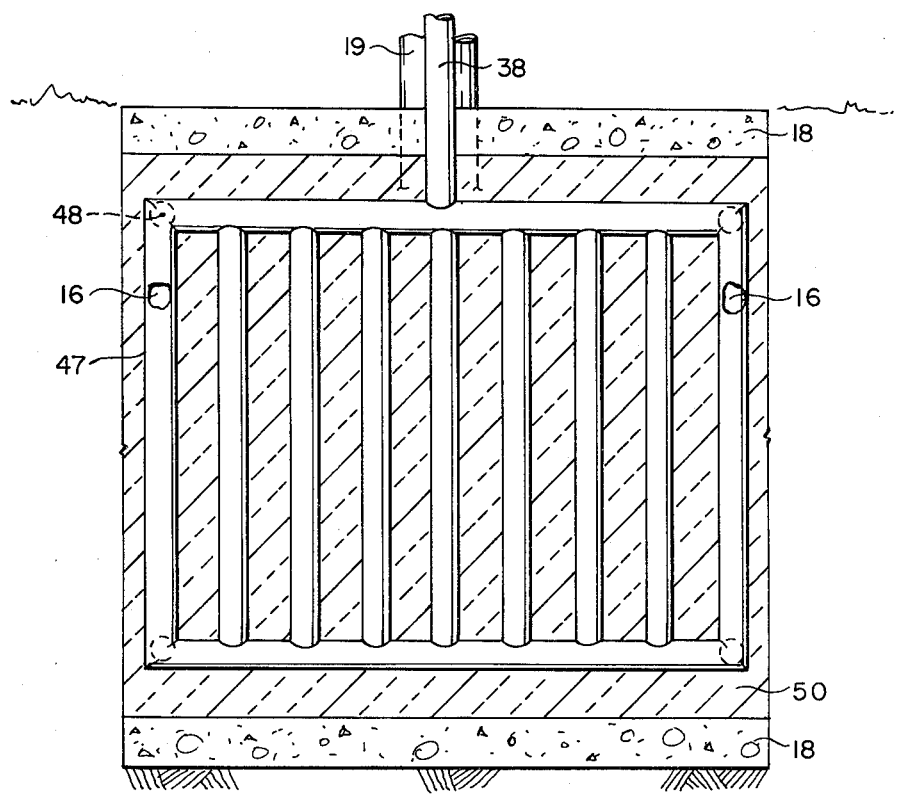
FIG. 2 is a cross-sectional view of the furnace, taken along line II—II of FIG. 1.

The solar furnace 10 comprises a main heat hearth 11 buried in the ground, surrounded by concentric primary heat-transfer-medium-containing chamber 12, primary heat-absorption zone 13, secondary heat-transfer-medium-containing chamber 14, secondary heat-absorption zone 15, tertiary heat-transfer-medium-containing chamber 16, first heat-insulating zone 17 and casing 18, all of which will be described in greater detail hereinafter. While three such heat-transfer-medium-containing chambers are shown, it is equally feasible to have four or more such chambers or zones.

The main heat hearth 11 communicates with the source of solar heat by a heat shaft 19. The heat shaft 19 is shown connected to a connecting shaft 20 which is disposed at right angles thereto. Also at right angles to the connecting shaft is a transmitting shaft 21 depending from a solar-energy-capturing bulb 22. As shown, this bulb 22 consists of a generally semi-globular bulb 23 having a heat transparent one-way upper surface 24 and whose inner walls are coated with heat-reflecting surfaces 25 which reflect the heat to a central convex reflecting mirror 26 to transmit the heat rays of the sun 27 as collected as a collimated concentrated high temperature solar beam 28. A heat-reflecting mirror 29 is disposed at the intersection of the transmitting shaft 21 and the connecting shaft 20 to direct the collimated concentrated, high temperature solar beam 28 along the connecting shaft 20. A heat-reflecting mirror 20 is disposed at the intersection of the connecting shaft 20 and the heat shaft 19 to reflect the collimatated concentrated high temperature solar beam 28 in the connecting shaft 20 along the heat shaft 19. Such solar beam 28 is further concentrated by a lens 31 to contact a plurality of heat collector rods 32 piercing the heat shaft 19. The greater the distance of the heat collector rods 32 from the lens 31, the greater the length of heat collector rod 32 which is present within the heat shaft 19. At the bottom of the heat shaft 19, the heat collector rods 32 are disposed with their ends in the configuration of a heat capture circle. Each heat collector rod 32 is provided with a plurality of heat-dissipation fins 33 for the rapid efficient transfer of heat to heat-absorbing packing 34 within heat hearth 11. The heat-absorbing packing 34 surrounding the heat collector rods 32 within main heat hearth 11 is, for example, a metal of high heat conductivity, e.g., steel, aluminum, etc., preferably in comminuted form. The outer perimetrical walls 35 of the primary heat hearth 11 are provided by the inner perimetrical walls 35 of the primary chamber 12 (to be described hereinafter) and are made of a strong metal having high heat-transfer characteristics, e.g., steel.

Disposed concentrically around the main heat hearth 11 between the main heat hearth 11 and the primary heat-absorption zone 13 is the primary chamber 12 containing a heat-transfer medium. The primary chamber 12 has a single outlet conduit 36 leading by way of a check valve 37 to an upwardly extending common vapour shaft 38 which preferably is insulated (not shown). Vapour shaft 38 leads to the inlet 39 of a vapour-powered electricity-generating turbine 40. While water is the preferred heat-transfer medium, since the generating system (as will be explained later) is a closed loop system, other liquids of high heat conductivity may be used, e.g., ethylene glycol or mercury. The walls of the primary chamber are made of a suitable heat-transfer characteristics metal, e.g., steel.

The primary heat-absorption zone 13 concentrically surrounding the primary chamber 12 is packed with a suitable heat-absorbing medium. One suitable such medium is sand, stone or clay, or any other medium of similar heat-transfer characteristics. Since there is a considerable amount of air (void) space in this zone, it is preferred to replace such air with a suitable low melting point substance, poured in the molten state, e.g., lead. This will also increase the use of latent heat in the system. The inner perimetrical walls 41 of the primary heat-absorption zone 13 are defined by the inner perimetrical walls 43 of the secondary chamber 14 (to be described hereinafter) and are made of a strong metal, e.g., steel.

Disposed concentrically around the primary heat-absorption zone 13 between that zone 13 and the secondary heat-absorption zone 15 is a secondary chamber 14 containing the same heat-transfer medium as in the primary chamber 12. The secondary chamber 14 has a single outlet conduit 44 leading by way of a check valve 45 to the upwardly extending common vapour shaft 38. The inner perimetrical 42 and the outer perimetrical 43 walls of the secondary chamber 14 are made of a strong metal, e.g., steel.

The secondary heat-absorption zone 15 concentrically surrounding the secondary chamber 14 is packed with a suitable heat-absorbing medium. One suitable such medium is bricks, or any other medium of similar heat-transfer characteristics. The inner perimetrical walls 43 of the secondary heat-absorption zone 15 are defined by the outer perimetrical walls 43 of the secondary chamber 14, and the outer perimetrical walls of this zone 15 are defined by the inner perimetrical walls 46 of the tertiary chamber 16 (to be described hereafter) and are made of a strong metal, e.g., steel.

Disposed concentrically around the secondary heat-absorption zone 15 between that zone 15 and the primary heat-insulation zone 17 is a tertiary chamber 16 containing the same heat-transfer medium as in the primary 12 and secondary 14 chambers. The tertiary chamber 16 has a single outlet conduit 48 leading by way of a check valve 49 to the common upwardly extending vapour shaft 38. The inner perimetrical 46 and outer perimetrical 47 walls of the tertiary chamber 16 are made of a strong metal, e.g., steel.

The first heat-insulation zone 17 concentrically surrounding the tertiary chamber 16 is packed with a suitable heat-insulating medium 50. One suitable such medium is asbestos, although any other medium of similar characteristics can be used. The inner perimetrical walls 47 of the first heat-insulation zone 17 are defined by the outer perimetrical walls 47 of the tertiary chamber 16. The outer perimetrical walls 18 of this zone are defined by a concrete shell 18 which completely encases the entire combination of zones defining the solar furnace 10.

The outlet vapour effluent line 51 from the vapour-powered electricity-generator 40 is connected to a condensation conduit 52 which is connected, via a check valve 53, to the inlet of a primary liquid reservoir 54. Primary liquid reservoir 54 is provided with heat exchanger tubes 55 to extract residual sensible heat from the liquid in primary liquid reservoir 54.

Primary reservoir 54 is connected to a lower liquid transfer reservoir 56 by means of a primary check valved flow conduit 57, and by a secondary, ball-valve-controlled flow conduit 58. Ball valve 59 is a valve in a cage 60 which moves in a controlled fashion either to seal the main outlet 61 from the lower liquid transfer reservoir 56 or to allow liquid to enter the lower liquid transfer reservoir from the primary reservoir 54 through secondary outlet 62.

Installed in parallel to the lower liquid transfer reservoir 56 by means of inlet line 75 from lower liquid transfer reservoir 56 and outlet line 76 to refill line 70 is a powered water pump 77. The pump may be driven either by steam or by electricity. The pump 77 may be used alone or simultaneously with the previously defined refill mechanism. The pump 77 would just keep a constant water pressure in the refill line 70. This assures more consistent operation of the system.

OPERATION OF PREFERRED EMBODIMENT

In operation, the outermost heat-transfer and heat-absorption zones will be used first. The center of the furnace is hottest, and heat travels outwardly therefrom. Hence, when the outermost heat-transfer and heat-absorption zones cannot receive enough heat to vaporize the liquid in the heat-absorption zones, the thermostatic actuators open the solenoid valve for the next set of heat-transfer and heat-absorption zones closer to center. Therefore at sunless periods (e.g., nighttime), the zones closer to the center would be used.

In more specific terms, in operation, during daytime operation, the sun's rays are collected and concentrated by the collector 23 and the collimated concentrated high temperature solar beam 28 is reflected along the connector shaft 30 down the main heat shaft 19 where it is concentrated still further by the lens 31 and is passed to the bottom 63 of the heat shaft 19 in the main heat hearth 11. The steel walls of the heat shaft 19 become very hot and the heat is transmitted to the heat collector rods 32. The heat collector rods 32, too, which project into the heat shaft 19, also absorb heat and become very hot. The heat is radiated from the heat fins 33 on the heat collector rods 32 and the rods 32 themselves to the metal packing 34 filling the main heat hearth 11. The heat is then transferred to the primary chamber 12, where the liquid therein is heated to vapour. Further heat is transmitted through the primary heat-absorption zone 13 to the secondary chamber 14, where the liquid in that chamber is also heated to vapour. Still further heat is transmitted through the secondary heat-absorption zone 16 to the tertiary chamber 16 where the liquid therein is also heated to vapour. The excess heat is reflected back to the tertiary chamber 16 by the heat-insulating and heat-reflective characteristics of the asbestos 50 in the first insulation zone 17. Furthermore, the concrete shell 18 assures that as little heat as possible is transmitted to the earth 63.

When a heat sensor 64 detects sufficient vapour in the tertiary chamber 16, a signal is sent to the outlet control box 65 and this actuates opening of the check valve 49, allowing vapour to ascend the common vapour shaft 38 to operate the vapour-powered electricity-generating turbine 40, thereby generating electricity. The vapour effluent passes through the vapour conduit 52 to the primary reservoir 54. The primary reservoir 54 is designed to be of lesser capacity than that of the tertiary chamber 16 although the heat exchanger tubes 55 are designed to be in contact with condensed liquid in the primary reservoir 54.

When a predetermined level of liquid is reached in the primary reservoir 54, a signal actuates opening of the check valves 57, 58 between the primary reservoir and the lower liquid transfer reservoir 56 and the closing of the check valve 53 in the vapour line 52. This allows the still-hot liquid to drain quickly from the primary reservoir 54 to the lower liquid transfer reservoir 56 through main outlet 57. This in turn causes the float ball valve 59 controlling the outlet 61 from the lower liquid transfer reservoir 56 to begin to rise. At this time, a detector 66 determines which of the primary 12, secondary 14 or tertiary 16 chambers contains liquid, or liquid/vapour or vapour only and opens the respective solenoid check valve 67, 68 or 69 to the chamber which contains only vapour. This would normally, in daytime, be the tertiary chamber 16. This allows tertiary chamber 16 to fill by means of liquid from the lower transfer reservoir 56 through refill line 70. While the lower transfer reservoir 56 is still in the process of filling the primary 12, secondary 14 or tertiary 16 chambers, the primary reservoir 54 is emptied, and the check valves 57, 58 leading therefrom are closed, while the check valve 53 in the vapour line 52 is again opened, allowing hot liquid again to enter the primary reservoir 54. When the lower transfer reservoir 56 is emptied of its contents into the primary chamber 54, the float ball valve 59 again seals off the outlet 61 from the lower transfer reservoir 56. The pump 77 may also assist this action.

The liquid in the tertiary chamber 16 is brought to the vapour state by means of additional heat added by the solar heat and by means of any residual heat in the main heat hearth 11 and the casing 18. Thus, the cycle repeats with a closed cycle vapourization/condensation of the liquid in the tertiary chamber 16. This is continued as long as there is sufficient residual heat, after the sun no longer shines, to vapourize the liquid in the tertiary chamber 16.

Then the sensors 64 shut off the cycle in the tertiary chamber 16 and initiate a similar cycle in the secondary chamber 14. When, moreover, there is insufficient residual heat in the system to vapourize the liquid in the secondary chamber 14, the cycle in the secondary chamber is shut off and a similar cycle is initiated in the primary chamber 12. By this time, the sun will be shining and there will be sufficient residual heat available there to maintain the primary cycle.

In practice, the parameters are so selected that there is a continuous generation of electricity. This may be achieved by a suitable dimensioning of the main heat hearth 11 and the heat-absorption zones 13, 15 and/or a suitable dimensioning of the heat-transfer-medium-containing chambers 12, 14, 16. In addition, a greater number of such chambers and heat-absorption zones may be provided to enable continuous operation.

SUMMARY

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be, within the full range of equivalence of the following claims.

What I claim is:

1. A solar furnace electricity generating system comprising:
   (a) a concentrator and accumulator for the sun's rays to generate a concentrated high temperature solar beam;
   (b) a heat hearth disposed to absorb heat from said concentrated high temperature solar beam;
   (c) a plurality of concentric alternating heat-transfer-medium-containing chambers and heat absorption zones around said heat hearth, said plurality of zones comprising
      (i) a primary chamber containing a first heat-transfer-medium in heat-transfer contact with said heat hearth;
      (ii) a primary heat-absorption zone containing a primary heat-absorbing material in heat-transfer contact with said primary chamber;
      (iii) a secondary chamber containing the same heat-transfer-medium in heat-transfer contact with said primary zone;
      (iv) a secondary heat-absorption zone containing a second and different heat-absorbing material in heat-transfer contact with said secondary chamber; and
      (v) a tertiary chamber containing the same heat-transfer-medium in heat-transfer contact with said secondary zone;
   (d) valved outlet lines leading from each said heating-transfer-medium-containing chamber to conduct such heat-transfer media to a common vapour outlet line leading to a vapour-powered electricity-generating turbine;
   (e) valved outlet line from said turbine connected to a liquid reservoir;
   (f) valved outlet means from said liquid reservoir to a plurality of valved inlet lines, each leading to an associated said heat-transfer-medium-containing chamber; and
   (g) control means to actuate selected vapourization/condensation cycles from selected heat-transfer-medium-containing chambers, to the exclusion of similar vapourization/condensation cycles from other heat-transfer-medium-containing chambers; thereby to result in substantially continuous generation of electricity during periods of daylight and nighttime.

2. The system of claim 1 wherein said heat hearth is provided with a central heat shaft to absorb heat from said concentrated high temperature solar beam.

3. The system of claim 2 wherein said heat shaft is pierced by a plurality of heat-absorbing metal rods.

4. The system of claim 3 wherein each said heat-absorbing metal rod projects into said heat hearth and is provided with a plurality of heat-dissipating ribs.

5. The system of claim 4 wherein said heat hearth is packed with a heat-absorbing, heat-transfer material.

6. The system of claim 5 wherein said heat-absorbing, heat-transfer material is comminuted metal.

7. The system of claim 1 wherein each said primary, secondary and tertiary chambers comprises a double walled, hollow, rectangular parallelepiped chamber formed of a heat-conducting, structural material.

8. The system of claim 1 wherein said primary heat-absorbing material is selected from the group consisting of sand, stone and clay.

9. The system of claim 8 including an auxiliary packing of lead as a molten, low melting point substance.

10. The system of claim 1 wherein said secondary heat-absorbing material is bricks.

11. The system of claim 1 including a first heat-insulating zone in heat-transfer contact with said tertiary chamber.

12. The system of claim 11 wherein said first heat-insulating zone is packed with asbestos as a heat-insulating material.

13. The system of claim 1 encased in concrete as a heat-insulating structural casing.

14. The system of claim 1 wherein said concentrator (a) includes a semi-globular hollow one-way mirror bulb terminating in a depending shaft for the passage of said collimated concentrated high temperature solar beam.

15. The system of claim 14 wherein said semi-globular bulb includes additional heat-reflecting internal mirrors to assist in collimating and concentrating said sun's rays.

16. The system of claim 14 including at least one connecting heat-conducting shaft to convey said solar beam to said heat shaft, assisted by 45° reflectors.

17. The system of claim 14 wherein said heat shaft includes a heat concentrating lens therein.

18. The system of claim 1 wherein said valves in the outlets from each said heat-transfer-medium-containing chamber are one-way valves adapted to open automatically at a minimum pre-set vapour pressure.

19. The system of claim 1 wherein said valves in the inlets to each said heat-transfer-medium-containing chamber are one-way valves adapted to open upon positive activation provided a minimum pre-set vapour pressure condition is satisfied.

20. The system of claim 1 wherein said valve on said outlet line from said turbine is a one-way valve adapted to be opened upon positive activation.

21. The system of claim 1 wherein said reservoir includes an upper primary reservoir and a lower liquid transfer reservoir.

22. The system of claim 1 wherein said heat-transfer medium is water.

23. The system of claim 1 wherein each of the primary, secondary and tertiary heat-transfer medium-containing chambers comprise a plurality of interconnected, spaced apart, network of tubular members.

24. A solar furnace electricity generating system comprising:
   (a) a concentrator and accumulator for the sun's rays to generate a concentrated high temperature solar beam;
   (b) a heat hearth disposed to absorb heat from said concentrated high temperature solar beam;
   (c) a plurality of concentric alternating heat-transfer-medium-containing chambers and heat absorption zones around said heat hearth, said plurality of zones comprising (i) a primary chamber containing a first heat-transfer-medium in heat-transfer contact with said heat hearth;
(ii) a primary heat-absorption zone containing a primary heat-absorbing material in heat-transfer contact with said primary chamber;
(iii) a secondary chamber containing the same heat-transfer-medium in heat-transfer contact with said primary zone;
(iv) a secondary heat-absorption zone containing a second and different heat-absorbing material in heat-transfer contact with said secondary chamber; and
(v) a tertiary chamber containing the same heat-transfer-medium in heat-transfer contact with said secondary zone;
(d) valved outlet lines leading from each said heat-transfer-medium-containing chamber to conduct such heat-transfer media to a common vapour outlet line leading to a vapour-powered electricity-generating turbine;
(e) valved outlet line from said turbine connected to a liquid reservoir, said reservoir including an upper primary reservoir and a lower liquid transfer reservoir;
(f) valved outlet means from said liquid reservoir to a plurality of valved inlet lines, each leading to an associated said heat-transfer-medium-containing chamber;
(g) control means to actuate selected vapourization/condensation cycles from selected heat-transfer-medium-containing chambers, to the exclusion of similar vapourization/condensation cycles from other heat-transfer-medium-containing chambers; and
(h) said upper reservoir being provided with auxiliary heat exchanger to recover sensible heat from liquid in said upper reservoir;
thereby to result in substantially continuous generation of electricity during periods of daylight and nighttime.

25. A solar furnace electricity generating system comprising:
(a) a concentrator and accumulator for the sun's rays to generate a concentrated high temperature solar beam;
(b) a heat hearth disposed to absorb heat from said concentrated high temperature solar beam;
(c) a plurality of concentric alternating heat-transfer-medium-containing chambers and heat absorption zones around said heat hearth, said plurality of zones comprising
(i) a primary chamber containing a first heat-transfer-medium in heat-transfer contact with said heat hearth;
(ii) a primary heat-absorption zone containing a primary heat-absorbing material in heat-transfer contact with said primary chamber;
(iii) a secondary chamber containing the same heat-transfer-medium in heat-transfer contact with said primary zone;
(iv) a secondary heat-absorption zone containing a second and different heat-absorbing material in heat-transfer contact with said secondary chamber; and
(v) a tertiary chamber containing the same heat-transfer-medium in heat-transfer contact with said secondary zone;
(d) valved outlet lines leading from each said heat-transfer-medium-containing chamber to conduct such heat-transfer media to a common vapour outlet line leading to a vapour-powered electricity-generating turbine;
(e) valved outlet line from said turbine connected to a liquid reservoir, said reservoir including an upper primary reservoir and a lower liquid transfer reservoir;
(f) valved outlet means from said liquid reservoir to a plurality of valved inlet lines, each leading to an associated said heat-transfer-medium-containing chamber;
(g) control means to actuate selected vapourization/condensation cycles from selected heat-transfer-medium-containing chambers, to the exclusion of similar vapourization/condensation cycles from other heat-transfer-medium-containing chambers; and
(h) said primary reservoir being connected to said lower liquid transfer reservoir by means of a primary check-valved flow conduit, and by a secondary, ball valve controlled flow conduit, said ball valve being a caged valve which moves in a controlled fashion either to seal a main outlet from said lower liquid transfer reservoir, or to allow liquid to enter said lower liquid transfer reservoir from said primary reservoir;
thereby to result in substantially continuous generation of electricity during periods of daylight and nighttime.

* * * * *